(12) United States Patent
Zoppi

(10) Patent No.: US 8,764,019 B2
(45) Date of Patent: Jul. 1, 2014

(54) GASKET FOR A VALVE IN AN INTERNAL COMBUSTION ENGINE

(75) Inventor: Claudio Zoppi, Pinerolo (IT)

(73) Assignee: Corcos Industriale S.a.s. di Freudenberg & Cosso S.r.l., Pinerolo (IT)

(*) Notice: Subject to any disclaimer, the term of this patent is extended or adjusted under 35 U.S.C. 154(b) by 467 days.

(21) Appl. No.: 11/961,368

(22) Filed: Dec. 20, 2007

(65) Prior Publication Data

US 2008/0157482 A1 Jul. 3, 2008

(30) Foreign Application Priority Data

Dec. 29, 2006 (EP) .................................... 06425888

(51) Int. Cl.
  *F02F 11/00* (2006.01)
(52) U.S. Cl.
  USPC ......................................................... 277/502
(58) Field of Classification Search
  USPC ......................................................... 277/502
  See application file for complete search history.

(56) References Cited

U.S. PATENT DOCUMENTS

| | | | | |
|---|---|---|---|---|
| 5,167,419 A | * | 12/1992 | Robertson | 277/552 |
| 6,230,679 B1 | | 5/2001 | Hegernier et al. | |
| 6,244,235 B1 | * | 6/2001 | Hegemier et al. | 123/188.6 |
| 6,450,143 B1 | | 9/2002 | Hegemier et al. | |
| 6,764,079 B1 | | 7/2004 | Hegemier et al. | |
| 6,938,877 B2 | | 9/2005 | McArthy et al. | |
| 2009/0146382 A1 | * | 6/2009 | Sakata et al. | 277/502 |

FOREIGN PATENT DOCUMENTS

| | | |
|---|---|---|
| DE | 2943524 | 4/1981 |
| EP | 0519158 | 12/1992 |
| JP | 08296414 | 11/1996 |
| JP | 2000 329234 | 11/2000 |
| JP | 2003 042301 | 2/2003 |
| JP | 2004176881 | 6/2004 |

* cited by examiner

*Primary Examiner* — Gilbert Lee
(74) *Attorney, Agent, or Firm* — Daniel J. Sepanik, Esq.; Harness, Dickey & Pierce, P.L.C.

(57) ABSTRACT

A gasket for a valve in an internal combustion engine is provided with a first elastically deformable portion adapted to cooperate with a rod of the valve. A second elastically deformable portion is adapted to cooperate with an outer surface of a guide element of the valve, and a third elastically deformable portion is interposed between the first and the second elastically deformable portions and bearing a cantilevered gas tight seal lip is adapted to cooperate with the rod of the valve. The lip displays a frustoconical configuration with a section decreasing in opposite direction to the pressure forces directed towards the first elastically deformable portion and is connected to the third elastically deformable portion at its greater section part. The lip is further connected on the side exposed to the pressure forces, to the third elastically deformable portion by a surface bearing one or more waves.

9 Claims, 3 Drawing Sheets

GASKET FOR A VALVE IN AN INTERNAL COMBUSTION ENGINE

CROSS-REFERENCE TO RELATED APPLICATIONS

This application claims the benefit of European Patent Application No. EP06425888.2, filed Dec. 29, 2006, the disclosure of which is incorporated herein by reference.

FIELD

The present disclosure relates to a gasket for a valve in an internal combustion engine.

BACKGROUND AND SUMMARY

The statements in this section merely provide background information related to the present disclosure and may not constitute prior art.

There are known internal combustion engines for motor vehicles comprising a head bearing one or more cylinders, within which the work cycle is carried out, and which are placed in communication with respective combustion chambers of the engine itself. On the above mentioned head, there are further obtained appropriate seats intended to let the combustion chamber communicate with ducts adapted to supply a mixture of unburnt fuel and air to said chamber ("suction ducts"), and discharge the burnt gases from said combustion chamber ("discharge ducts").

The flows from and to each combustion chamber are controlled by appropriate valves operating on the mentioned seats. Specifically, each valve generally comprises a guide element fixed within a cavity of the engine head and a slidingly displaceable rod in opposite directions within a through seat defined by the guide element and bearing, at one end, a clogging section to close the connection between the relative suction or discharge duct and the corresponding combustion chamber.

The opposite end of the rod of the valve axially protrudes from the relative guide element and is adapted to receive driving forces from a relative control device.

On the valves of the above described type, there are normally mounted seal gaskets for the lubricating oil normally circulating in the engines. Such gaskets, in one of the most commonly known forms, comprise a support or reinforcing element having a substantially tubular configuration, generally made of a metal material, and an element made of elastomeric material interposed between the support element and the valve.

Specifically, the elastomeric element typically comprises a first portion adapted to cooperate by means of its inner surface with the outer surface of the upper portion of the guide element, and a second portion adapted to directly cooperate with the rod of the valve.

The gaskets of the above described type are widely used in all internal combustion engines to control the amount of lubricating oil that flows from the distribution area towards the combustion chambers. An excessive flow of lubricating oil causes a deterioration in efficiency of the engine and a drop in the performance of the motor vehicle catalytic converter as well as an evident excessive consumption of the oil itself. On the other hand, an insufficient flow determines an increase in the wear and the noise of the valves together with the occurrence of local temperature peaks. These phenomena may determine a premature damage of the valves following the seizure of the rod of the valves themselves within the guide element.

The known gaskets allow the construction of a static-type seal by means of the first portion of the elastomeric element operating on the guide element of the relative valve, and the construction of a dynamic-type seal by means of the second portion of the elastomeric element cooperating with the rod. Specifically, the static seal must ensure a certain degree of radial compression on the guide element in order to avoid the throttling of the lubricating oil to the combustion chambers and at the same time maintain the gasket itself in position, whereas the dynamic seal is designed to allow the minimum flow of oil required for the lubrication of the coupling between rod and guide element.

The support element comprises a first substantially cylindrical portion and a second discoidal annular portion, extending from an axial end of the first portion towards the valve in a transversal direction with respect to the axis of the first portion itself; such a second portion is partially drowned in the elastomeric element.

There are known gaskets of the above described type, in which the elastomeric element is further provided with an annular gas tight seal lip, commonly known as "gas lip", which is normally arranged in a position interposed between the mentioned first and second portions and cooperates with the rod of the relative valve.

Such a lip serves to counteract the positive pressures of the gases which in some applications occur at the seats on which the valves operate; it protrudes towards the rod of the relative valve from the inner circumferential surface of the elastomeric element and displays an annular frustoconical configuration having a decreasing section in opposite direction to the direction of the pressure forces of the gases ascending along the valves from the relative seats on which such valves operate.

The gas tight seal lip is connected to the remaining part of the elastomeric element at its part displaying a section having a greater diameter and along its radially outermost peripheral edge; in this manner, a sort of virtual hinge between the gas tight seal lip and the inner circumferential surface of the elastomeric element is made.

In the presence of pressure forces ascending along the valve from the seat controlled by such a valve, the gas tight seal lip normally tends to be rotated towards the rod of the valve itself so as to increase the sealing effect. However, in the case in which the pressures involved are especially high, the seal lip could be rotated with respect to the circumferential line which connects it to the inner surface of the elastomeric element by an angle such that it reverses the orientation of its conicalness; in practice, the gas tight seal lip would be arranged with decreasing sections in the direction of the pressure forces it should counteract, therefore losing any counteracting ability.

To overcome such a drawback, it would be required to increase the resistance of the gas tight seal lip so as to make it virtually rigid with respect to high gas pressure values. Such a solution would although be at the expense of the flexibility which such a lip should in any case maintain to allow to restore, during assembly, possible concentricity errors between the gasket and the rod of the valve.

The present disclosure provides a gasket for a valve in an internal combustion engine, which allows to overcome the drawbacks related to the gaskets of the known and above specified type in a simple and cost-effective manner.

The present disclosure refers to a gasket for a valve in an internal combustion engine, said valve comprising a guide element defining a through seat, and a slidingly displaceable rod in such a seat, said gasket comprising a first elastically deformable portion adapted to cooperate with the rod of said valve; a second elastically deformable portion adapted to cooperate with the outer surface of said guide element; and a third elastically deformable portion interposed between said first and second elastically deformable portions and bearing a cantilevered gas tight seal lip adapted to cooperate with said rod of said valve; said lip displaying a frustoconical configuration having a decreasing section in opposite direction to the pressure forces directed in use towards said first elastically deformable portion and being connected to said third elastically deformable portion at its greater section part; wherein said lip is connected, on the side exposed to said pressure forces, to said third elastically deformable portion by a surface bearing one or more waves.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
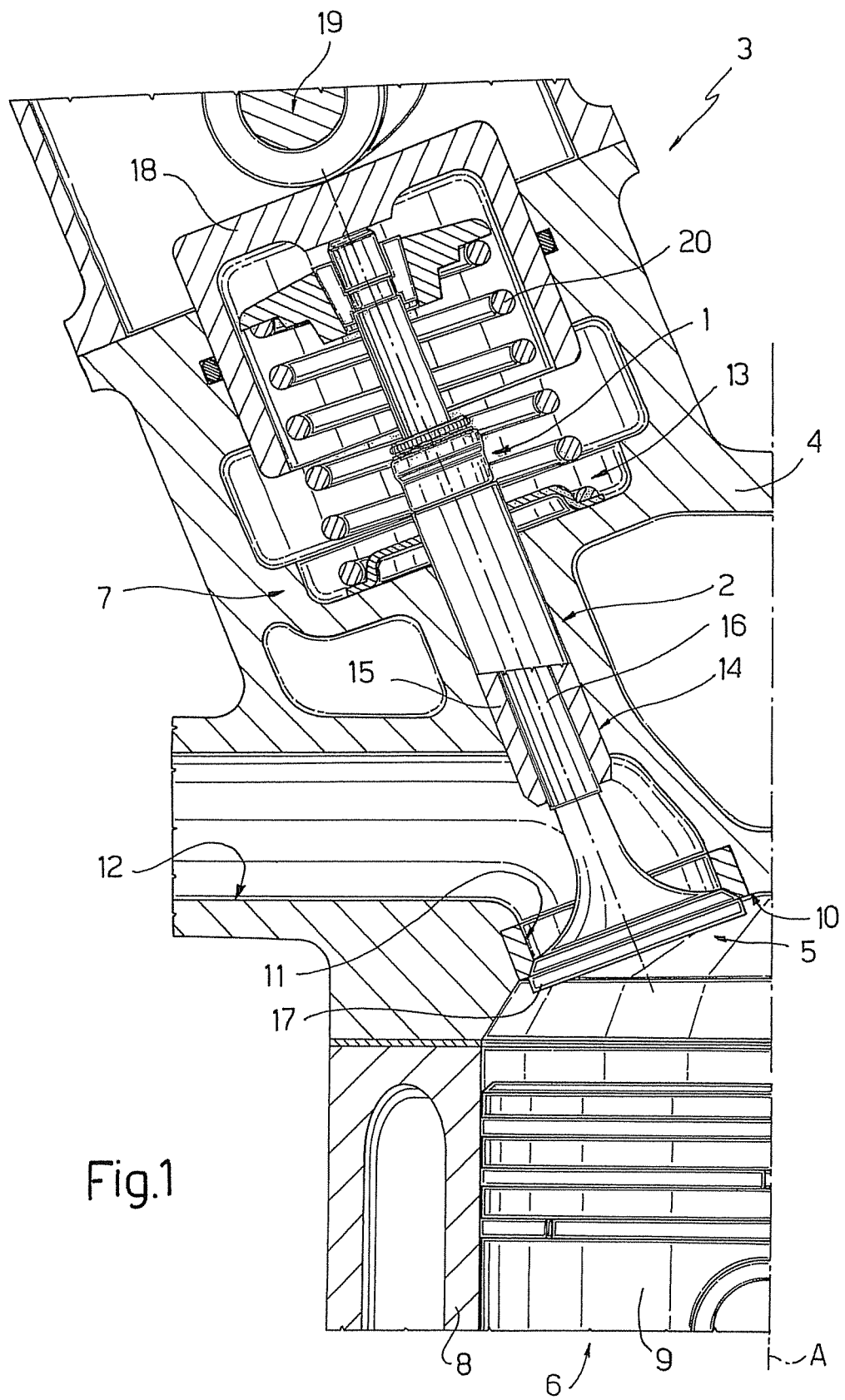
FIG. 1 is a partial cross-section view of an internal combustion engine provided with a gasket for a valve constructed according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, numeral 1 indicates, as a whole, a gasket according to the present disclosure for a valve 2 in an internal combustion engine 3, intrinsically known and only shown as far as required for the understanding of the present disclosure.

In greater detail, in FIG. 1 engine 3 is shown as regards to a portion of a head 4 symmetrically extending with respect to an axis A and only half shown.

The above mentioned portion of the head 4 defines a combustion chamber 5 (only partially shown), within which a combustible gas is oxidised in the presence of comburent air so as to convert the chemical energy contained in the combustible gas to pressure energy, and a cylinder 6 (also only partially shown) having an axis A which is fluidically connected to the combustion chamber 5 and adapted to convert the above mentioned pressure energy to mechanical energy.

Moreover, the portion of the head 4 houses a supply assembly (intrinsically known and not shown) adapted to supply a mixture comprising the combustible gas and the comburent air within the combustion chamber 5, and a discharge assembly 7 adapted to discharge the burnt gas and air from the combustion chamber 5 itself towards the environment external to the engine 3.

In greater detail, the cylinder 6 comprises a liner 8 and a piston 9, which is slidable under the action of the fuel pressure within the liner 8 itself according to an alternative motion directed along the axis A and is operatively connected (in a manner which is not shown) to a mover to convert pressure energy to mechanical energy.

The combustion chamber 5 is axially delimited by an end wall 10 and is open, on a part axially opposite with respect to the end wall 10, towards the cylinder 6.

The end wall 10 of the combustion chamber 5 displays a pair of circular through apertures (only one of which is shown and is indicated by numeral 11), positioned symmetrically with respect to the axis A. More specifically, the aperture which is not shown is adapted to allow the transit of the mixture comprising the combustible gas and the comburent air coming from the supply assembly (which is also not shown) within the combustion chamber 5; the aperture indicated by numeral 11 is adapted to allow the transit of the burnt gases from the combustion chamber 5 to the discharge assembly 7.

The supply assembly and the discharge assembly 7 are fairly similar and extend reciprocally symmetrical with respect to the axis A; for the sake of simplicity, the present description will only refer to the discharge assembly 7, being understood that considerations similar to those set forth for the discharge assembly 7 will also be applicable to the supply assembly.

In detail, the discharge assembly 7 comprises a discharge duct 12, which extends from the aperture 11 towards the environment external to the engine 3, and cooperates with a valve 2 adapted to engage, according to predetermined time laws, the aperture 11 so as to adjust the flow of burnt gases from the combustion chamber 5 to the duct 12 itself.

Figure 2:
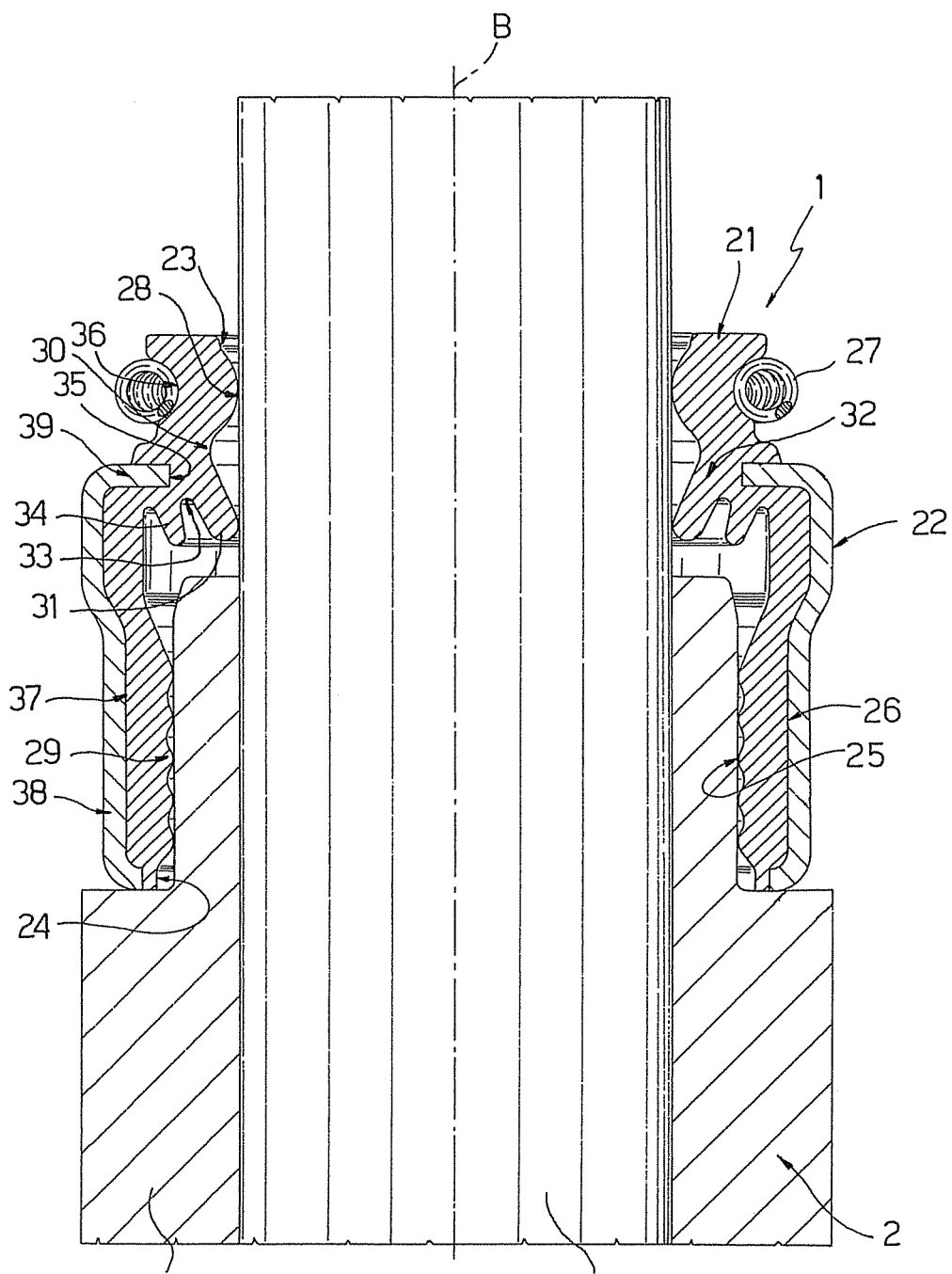
FIG. 2 is an axial cross-section view on an enlarged scale of the valve and gasket in FIG. 1; and FIGS. from 3 to 5 are axial sections on a reduced scale illustrating variants of the gaskets in FIGS. 1 and 2.
Figure 3:
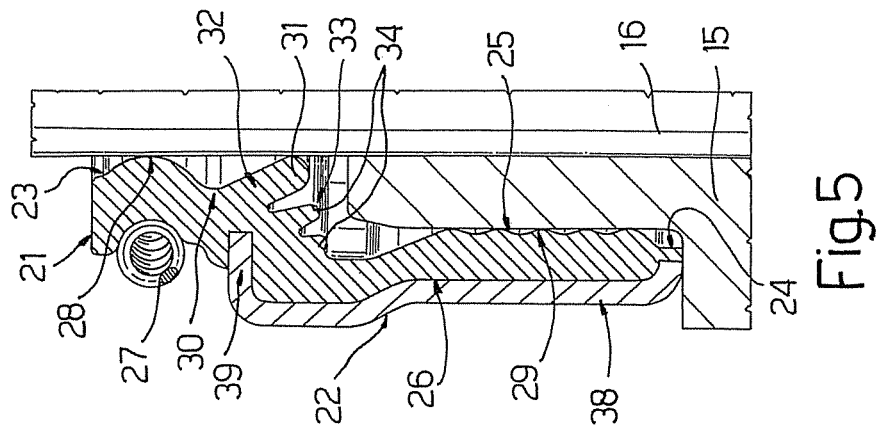

The valve 2, shown in detail in FIG. 2, is housed in a seat 13, which is obtained in the head 4 and normally contains lubricating oil.

More precisely, the seat 13 extends symmetrically with respect to an axis B, transversely with respect to the axis B, and results open at a terminal segment thereof 14 which is axial towards the duct 12.

The valve 2 comprises a tubular guide element 15 which is interference-fitted within the terminal portion 14 of the seat 13, and a slidingly displaceable rod 16 in opposite directions along the axis B within the guide element 15.

On the outer circumferential surface of the end of the guide element 15 opposite to the duct 12 a relative gasket 1 according to the invention is fitted coaxially surrounding both the guide element 15 and the rod 16.

In greater detail, the rod 16 protrudes on opposite parts of the guide element 15 and respectively comprises, at its opposite axial ends, a clogging section 17, intended to fluid-sealingly engage the aperture 11, and a section 18 adapted to receive a driving force by means of a control mechanism 19, which in this case is shown to be of the cam type.

The valve 2 further comprises a spring 20, in this case shown to be of the helicoidal type, which cooperates at its reciprocally opposite axial ends with the section 18 and with a delimitation wall of the seat 13 facing towards the clogging section 17; the spring 20 is adapted to generate a return elastic force on the rod 16 such that it is always maintained in contact with the control mechanism 19, at its section 18.

With special reference to FIG. 2, the gasket 1 displays a substantially tubular configuration according to a coinciding axis, in mounting conditions, with the axis B.

More precisely, the gasket 1 comprises an annular shaped elastomeric element 21, and a support element 22 which is coaxially fixed on the elastomeric element 21 itself to press the latter, in a radial direction with respect to the axis B, on the guide element 15 and on the rod 16. In practice, the elastomeric element 21 is interposed between the support element 22 and the valve 2.

The elastomeric element 21 defines, moving along the axis B towards the combustion chamber 5, first a dynamic type seal adapted to allow the transit of a minimum flow of oil required for the lubrication of the coupling between the rod 16 and the guide element 15, and then a static type seal to prevent the oil flow towards the combustion chamber 5.

In greater detail, the elastomeric element 21 is delimited by two discoidal sections 23, 24 having an axial end, which are opposite to one another, by an inner circumferential surface 25 adapted to cooperate partially with the rod 16 and partially with the guide element 15 to obtain the above mentioned seals, and an outer circumferential surface 26 adapted to couple with the support element 22 and with an annular elastic collar 27 so as to press the inner circumferential surface 25 on the rod 16 and on the guide element 15.

The section 23, in mounting conditions, faces the control mechanism 19 and the rod 16 passes through it; the section 24, in mounting conditions, faces towards the combustion chamber 5, and both the rod 16 and the guide element 15 pass through it.

The inner circumferential surface 25 of the elastomeric element 21 comprises, in a position adjacent to the section 23, a section 28 having a minimum diameter, adapted to be radially pressed by the elastic collar 27 against the rod 16 to define a circumferential dynamic type seal line, which allows the outflow of a minimum oil flow in virtue of the sliding coupling with the rod 16 itself.

The inner circumferential surface 25 of the elastomeric element 21 further comprises, in a position adjacent to the section 24, a substantially cylindrical portion 29, adapted to be radially pressed by the support element 22 against the guide element 15 so as to define a cylindrical static type seal area.

The inner circumferential surface 25 of the elastomeric element 21 further comprises, in a position interposed between the section 28 and the portion 29, a further portion 30 bearing a cantilevered gas tight seal lip 31 cooperating in use with the rod 16 of the valve 2.

The lip 31 displays a frustoconical configuration having an axis B with a decreasing section in opposite direction to the pressure forces generated by the gases flowing through the duct 12 and directed towards the section 28; in the case shown, the lip 31 has a decreasing section towards the portion 29.

As shown in FIG. 2, the lip 31 is connected to the portion 30 of the inner circumferential surface 25 of the elastomeric element 21 at its greater section part. Such a connection defines a sort of virtual hinge 32 between the lip 31 and the inner circumferential surface 25 of the elastomeric element 21.

Advantageously, the lip 31, on the side exposed to the pressure forces, i.e. that facing towards the support element 22, is connected to the portion 30 of the inner circumferential surface 25 by means of a surface 33 bearing at least one wave 34.

Figure 4:
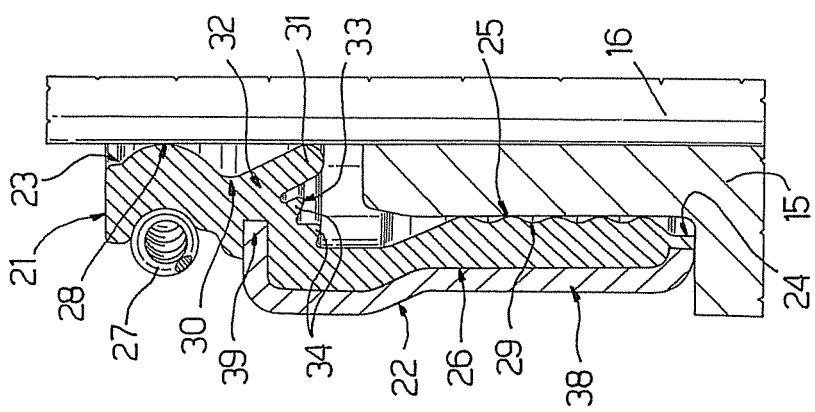
Figure 5:
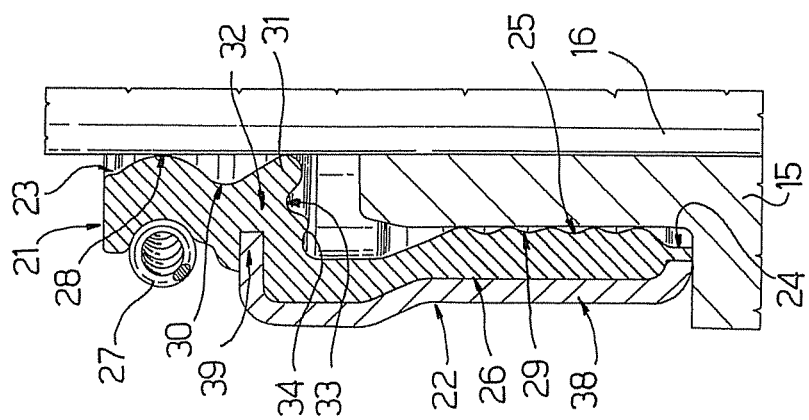

In Figures from 3 to 5, possible variants of the configuration of the surface 33 are shown with one or more waves 34 having heights and widths identical to one another (FIG. 4) or different from one another (FIG. 5).

The effect of the surface 33 with one or more waves 34 is to create a sort of "spring" generating a return action on the lip 31 which tends to prevent the rotation thereof towards the section 28 around the virtual hinge 32 under the action of the pressure forces generated by gases flowing through the duct 12. By acting on the geometry of the waves 34, it is possible in practice to vary the elastic module of the "spring" defined by the surface 33.

The outer circumferential surface 26 of the elastomeric element 21 defines, near the section 28, a notch 35, the function of which will become clear hereinafter; the notch 35 subdivides the outer circumferential surface 26 in a housing portion 36 of the elastic collar 27, extending towards the section 23, and an elongated portion 37 extending towards the section 24 and adapted to couple, together with the notch 35 itself, with the support element 22.

With special reference to FIG. 2, the support element 22 comprises a first portion 38, which is substantially cylindrical and elongated according to the axis B, and a second discoidal annular portion 39, extending from an axial end of the portion 38 in a transversal direction, in this case orthogonal, with respect to the axis B so as to partially be drowned in the notch 35 of the elastomeric element 21.

From a test for the features of the gasket 1 made according to the principles of the present disclosure, the advantages it allows to obtain are clear.

Specifically, the waves 34 confer the lip 31 a good ability to tolerate the action of the pressure forces, which tends to rotate it towards the section 28 around its virtual hinge 32. Such a feature is obtained without decreasing the flexibility of the lip 31 which may therefore optimally fit to the rod 16 of the relative valve 2 compensating, where required, the possible errors of the concentricity between the gasket 1 and the valve 2 itself.

It is finally clear that modifications and variants not departing from the scope of protection as defined by the claims may be made to the gasket 1 here described and shown.

What is claimed is:

1. A gasket for a valve of an internal combustion engine, said valve comprising a guide element defining a through seat, and a slidingly displaceable rod in the seat, said gasket comprising:
    a tubular support element;
    a first elastically deformable portion including a dynamic seal adapted to cooperate with the rod of said valve;
    a second elastically deformable portion adapted to cooperate with an outer surface of said guide element, said second elastically deformable portion supported by said tubular support element; and
    a third elastically deformable portion interposed between said first and second elastically deformable portions and bearing a cantilevered gas tight seal lip adapted to cooperate with said rod of said valve; said lip displaying a frustoconical configuration having a decreasing section in opposite direction to the pressure forces directed in use towards said first elastically deformable portion and being connected to said third elastically deformable portion at its greater portion part;
    wherein said lip is connected, on the side exposed to said pressure forces, to said third elastically deformable portion by means of a surface bearing a plurality of waves for creating a spring effect on said lip and which are spaced axially from said guide element along a direction parallel to said axis.

2. The gasket according to claim 1, wherein said plurality of waves have different heights.

3. The gasket according to claim 2, wherein each of said plurality of waves have different widths.

4. The gasket according to claim 3, wherein said first, second, and third elastically deformable portions are integrally formed as a one piece element made of elastomeric material.

5. The gasket according to claim 2, wherein each of said plurality of waves have widths identical to one another.

6. The gasket of claim 2, wherein each of said plurality of waves is devoid of contact with either the rod or the guide element.

7. The gasket according to claim 1, wherein said plurality of waves have heights identical to one another.

8. The gasket according to claim 7, wherein each of said plurality of waves have different widths.

9. The gasket according to claim 7, wherein each of said plurality of waves have widths identical to one another.

* * * * *